United States Patent Office 2,840,478
Patented June 24, 1958

2,840,478

COATING COMPOSITION

George Otto Orth, Jr., and John Spinelli, Seattle, Wash., assignors to American Potash & Chemical Corporation, a corporation of Delaware No Drawing. Application October 28, 1955
Serial No. 543,577

4 Claims. (Cl. 106—18)

This invention relates to surface protective coatings and, more particularly, to paints having improved fire-retardant properties. The invention also relates to certain inexpensive and simple ingredients which can be added to a paint to impart such properties.

The proposals for production of fire-retardant paints in the prior art are very numerous and, of these, some have resulted in fire-retardant surface protection compositions of value. Among the prior art materials used for this purpose are combinations of paint ingredients, antimony oxide and highly chlorinated organic materials such as chlorinated paraffin having sufficient combined chlorine so that the paraffin is a resinous type solid. In general, such surface protecting materials have been found highly practicable and suited both to interior and exterior surface applications. Unfortunately, however, antimony oxide is so expensive that its use in a paint is often prohibitive. Further, antimony oxide is a relatively scarce commodity.

There has also been an increasing demand by public authorities that public buildings and public places of assembly employ only materials which have substantial fire-retardant properties and that paints applied in such public places have similar properties. The tendency to specify such materials, moreover, has reflected itself in laws passed in sundry State legislatures, which have demanded that public buildings and public places of assembly have only fire-retardant materials incorporated therein and that these materials be decorated with fire-retardant surface protective agents, such as paints. The art, therefore, has sought a substitute for the expensive and scarce antimony type paints which would reduce the cost of fire protective surface coatings, while providing at least as much if not more fire-retardant properties. However, various proposals which have been made in the prior art directed to this end have unfortunately failed to success and, until the present invention, no fire protective paint composition was known which had properties comparable to antimony oxide paints and especially which could be provided at a cost considerably less than that of such materials.

The present invention contemplates the provision of a fire-retardant paint material having fire-retardant properties substantially equal to and in some cases greater than those possessed by antimony oxide paints. In addition, these properties are provided with materials of less cost and greater availability than has been the case with paints including antimony oxide.

The compositions of the present invention include, in addition to the standard and ordinary paint containing ingredients, an additional fire-retardant ingredient in the form of a low-melting inorganic material which is highly effective in providing increased fire-resistance. This mineral material is effective because, when subjected to heat, it provides a ceramic film on the painted surface which protects such painted surface. The frit fuses with the pigment particles present to provide a ceramic barrier to gases of decomposition given off by the carrier, e. g., a wood surface; the gases of decomposition, which are inflammable in most cases, are blocked and, in the case of wood or a like surface, inverted direction-wise into the wood where they are condensed or dispelled away from the burning surface.

The mineral material utilized in its simplest form is a finely divided mineral frit made up of carefully controlled amounts of boric oxide, lead oxide and sodium fluoride. In its simplest form, the present invention contemplates formation of a frit of boric oxide, lead oxide and sodium fluoride, cooling of the frit and its comminution to a fineness suitable for inclusion of the frit in a paint as a vehicle. To prepare the frit, one mixes the proper portions of boric oxide, lead oxide and sodium fluoride, heating these to an elevated temperature at which the mass is molten, then cooling and grinding the glass-like product to a desired size. If desired, the boric oxide can be provided by a boric acid, the lead oxide-boric acid-sodium fluoride mix being heated to drive off the water from the boric acid and form boric oxide in situ. In addition to boric oxide and lead oxide, the frit can desirably contain a small amount of antimony oxide, as will appear.

When prepared, the frit is added to any suitable paint and, in the purview of this invention, the completed composition of the present invention includes, in general, vehicles, pigments, and solvents, and may also include such secondary materials as driers, plasticizers, metallic soap and anti-oxidants.

The vehicle of the composition of the present invention may suitably be selected from various well-known drying components of paint, particular examples of such materials being alkyd resins, whether modified by well-known modifiers such as natural or synthetic oils or resins, or not, oleoresinous materials such as combinations with suitable oils, such as linseed, or natural gums or wood rosin, and natural or synthetic drying oils, such as vegetable oils, either raw or processed, viz. linseed oil. A vehicle chosen from any of these broad general groups may comprise entirely "solids," i. e., may have no components which are removed as by evaporation or the like from a paint upon the spreading of the same on a surface to be protected and drying, or may suitably be combined with sundry volatile solvents, such as mineral spirits, and the like, in which case the vehicle will of necessity be less than 100% solids.

The invention is not limited in application to inclusion in so-called oil-base paints since it can be included with good results in paints of the so-called water-base type and in which basically the liquid vehicle is provided by water and a binder such as polyvinyl acetate.

The pigments to be employed in the present paints will, of course, depend primarily upon the ultimate color desired, the term "pigment" in the disclosure of the present invention being taken to include materials such as extenders, inert fillers, solid diluents, and the like.

In addition, there may be present, as noted above, particularly where the vehicle is of the alkyd or oleoresinous type, a suitable amount of solvent to produce the desired consistency in the liquid paint, such as mineral spirits of a boiling range of 100°–260° C. being suitable. As no criticality ties to the particular solvent used and as various solvents may be found in standard texts on the subject, no others need be disclosed herein. It will further be understood, of course, that in the event that drying oils and the like are employed in the paint, the amount of solvent may be reduced considerably or perhaps eliminated entirely in accordance with well-understood paint industry practices and, in such case, the vehicle can comprise only solids, as is well-understood in the terminology of the paint art.

The secondary components of the paint composition may, as pointed out above, include such materials as driers, which may suitably comprise metal organo-salts, such as a metal napththenate of the general character of lead, cobalt, or manganese naphthenate, and other well-known materials generally employed for this purpose. In addition, optionally, may be included plasticizers, metallic soaps, and anti-oxidants for their well-known function in the paint composition, none of which functions affect either adversely or advantageously the flame-resisting element of the composition.

The flame-retardant character of the paints of the present invention may be tested in various ways in order to show that the paints of the present invention exhibit improved fire-retardancy over ordinary paints of commerce and in particular exhibit fire-retardancy properties of the general order of those in which antimony oxide is present and, in many cases, improved results over such paints. In general, the method of testing paints of this character has been to prepare panels which have been coated with one or two coats of the paint compositions, dried for a controlled period of time, after which they are burned under controlled conditions, the extent of protection of surface directly traceable to protective coating being observed. Suitable methods of testing are set forth in U. S. Department of Commerce Specification CS–42–49, and in Federal Specification TT–P–26a of January 13, 1954. Briefly, in this latter test, yellow poplar or hardwood free from knots and other imperfections are cut into panels ¼" x 6" x 12" in size, the panels being coated and dried. Each coated panel is weighed to the nearest 0.1 gram and the weight recorded. The panels are then subjected to burning with 5 ml. of absolute alcohol in a fuel cup placed in a specified burning apparatus. The weight loss upon burning is measured as is the maximum size of the charred areas. The paints of the present invention pass these tests with the same general character of excellence as those paints comprising antimony oxide and other flame-resistant materials and frequently excel those paints.

Based upon my findings, the frit should contain from 20 to 50 parts of $B_2O_3$ and from 25 to 60 parts of PbO and from 1 to 20 parts of NaF, all by weight. The preferred range is from 30 to 37 parts of $B_2O_3$, 48 to 60 parts of PbO, and 10 to 15 parts of NaF. The preferred composition containing 37.8 parts of $B_2O_3$, 48 parts of PbO, and 14.2 parts of NaF. The frits are added to the paint in such an amount that from 5% to 15% of the paint is frit on a wet basis; the preferred value being about 7%. On a dry basis, these values will change proportionately, the usual frit content being about 15% on this basis.

The preferred composition is a clear, colorless glass, fusing at 370° C. and has negligible water solubility. Its density is 3.58, which is in the range of common pigment materials, and it may therefore be incorporated with the pigment prior to incorporation of the latter into the liquid vehicle of the paint. This is preferably accomplished by mixing the pigment and the frit together in water, agitating these and permitting them to settle.

In order to inform those skilled in the art more particularly of the manner in which the paints of the present invention may be prepared, the following examples are offered as typical, it not being intended to limit the invention by the details of the examples, but merely to disclose the invention more fully in order to enable the invention to be practiced.

To provide a standard water base paint for reference, the following composition was made up in a large quantity.

Pigment composition: Parts
 Titanium dioxide _____ 15
 Dicalite _____ 10
 Clay _____ 25
 Lithopone _____ 40
 Water ground mica _____ 10

Total _____ 100

Paint composition wet basis: Parts
 Resin solids — polyvinyl acetate dispersion (55% p. v. a.) _____ 16
 Pigment mixture _____ 30
 Water _____ 54

Total _____ 100

Stable dispersion at brushing consistency was obtained by one pass through a Morehouse Model A–200 laboratory mill.

EXAMPLE I

To illustrate use of the preferred frit composition given above, mixtures were made up in the following proportions by weight:

| Ingredients | Paint 1 | Paint 2 | Paint 3 |
|---|---|---|---|
| Polyvinyl acetate dispersion (Bakelite, 58.2% solids) | 50.6 | 48.1 | 44.8 |
| Water | 75.8 | 72.1 | 67.1 |
| Titanium dioxide | 8.1 | 7.8 | 7.3 |
| Silicon dioxide | 5.2 | 5.0 | 4.6 |
| Clay | 13.5 | 12.8 | 12.0 |
| Lithopone | 22.0 | 20.1 | 19.6 |
| Mica | 5.2 | 5.0 | 4.6 |
| Frit | 20.0 | 30.0 | 40.0 |

These paints were applied at a level of 20 grams per square foot to both calendered and uncalendered Fir-Tex 18 pound density insulating board and compared in the Class F fire resistance test. A control was not used since the board would obviously be so severely charred without the frit that it would not provide a fair comparison. Char areas were as follows:

| Paint No. | Calendered Board, sq. in. | Uncalendered Board, sq. in. |
|---|---|---|
| 1 | 11 | 16 |
| 2 | 10 | 14 |
| 3 | 10 | 14 |

EXAMPLE II

To show the utility of the preferred frit in coating using an acrylic base as a vehicle, a paint was made up containing the following materials in the proportions indicated by weight, the frit being of the preferred composition given above.

Pigment Mixture: Percent
 Titanium dioxide _____ 30
 Lithopone _____ 30
 Zinc oxide _____ 20
 Calcium carbonate _____ 20

Paint: Parts
 Pigment mixture _____ 50
 Acrylic base _____ 70
 Water _____ 70

Paints were prepared containing 0, 5, 10 and 15 percent of the frit on a wet basis. The results were as follows:

| Paints Prepared | Percent Frit (wet basis) added | Char area |
|---|---|---|
| 1 | 5 | 11.7 |
| 2 | 10 | 11.2 |
| 3 | 15 | 11.2 |
| 4 (no addition) | | 15.5 |

EXAMPLE III

The preferred frit containing $B_2O_3$, PbO and NaF can be added to advantage with alkyd type paints. The frit was added at a level of 7 grams to 100 grams of paint to three commercial interior enamels:

1. National Lead Co.—Dutch Boy,
2. Devoe & Raynolds—Treasure Tone, and
3. duPont—Custom Color.

10 grams of duPont Custom Color per square foot were painted on calendered Fir-Tex Fibre Board (18 lb. density). These boards were allowed to air dry for 24 hours and a second coat of 10 grams was applied and allowed to dry for another 24 hours. The same application of paint was made to another set of fibre boards and the drying accomplished by heating the boards at 90° C. for 30 minutes between coatings. Results of Class F tests were as follows:

|  | Sq. in. |
|---|---|
| Air dry—with frit | 12 |
| Control | 15 |
| Heat dry—with frit | 12 |
| Control | 18 |

Douglas Fir plywood panels (6" x 12" x 5/8") were sanded, painted and dried in exactly the same manner as the fibre boards. Results of Class F tests were as follows:

*Air dried*

*Custom Color (duPont)*.—Control: Panel continued to burn for 4½ minutes after expiration of alcohol. With frit: Flame went out immediately after expiration of alcohol.

*Dutch Boy (National Lead)*.—Control: Panel continued to burn for 3½ minutes after expiration of alcohol. There was a considerable amount of fall out of the paint film. With frit: Flame went out immedately after expiration of alcohol.

*Treasure Tone (Devoe & Raynolds)*.—Control: Panel continued to burn for 2½ minutes after expiration of alcohol. There was a considerable fall out of the paint film. With frit: Flame went out immediately after expiration of alcohol.

*Heat dried*

*Custom Color (duPont)*.—Control: Continued to burn for 4 minutes after expiration of alcohol. With frit: Flame went out immediately after expiration of alcohol.

*Dutch Boy (National Lead)*.—Control: Flame went out immediately after expiration of alcohol. With frit: Flame went out immediately after expiration of alcohol.

*Treasure Tone (Devoe & Raynolds)*.—Control: Panel continued to burn for one minute 15 seconds after expiration of alcohol. With frit: Flame went out immediately after expiration of alcohol.

Total pigment content was determined on the above paints and was found to be as follows:

|  | Percent |
|---|---|
| Custom Color (duPont) | 33 |
| Dutch Boy (National Lead) | 53 |
| Treasure Tone (Devoe & Raynolds) | 57 |

The pigment in the duPont paint appeared to be all titanium dioxide, while the pigments in Dutch Boy and Treasure Tone were mainly mixtures of titanium dioxide, lithopone and calcium carbonate.

EXAMPLE IV

To show the utility of the preferred frit containing antimony oxide as a fire retardant in polyvinyl acetate coating, seven grams of antimony oxide ($Sb_2O_3$) were added to the polyvinyl acetate formula of Example I. This was compared to seven grams of frit in the same formula. Class F tests gave the following results:

|  | Char area, sq. in. |
|---|---|
| With antimony oxide | 9.3 |
| With frit | 10.0 |

EXAMPLE V

It has also been determined that small amounts of antimony oxide can be utilized to advantage in the frit composition hereinbefore disclosed, e. g., up to about 5 parts by weight, preferably about 2.5 parts. Several frits were made containing this material and were then subjected to the Class F test, the compositions of the frits and the results of the tests being shown in the following:

| Frit No. | | Parts | Color |
|---|---|---|---|
| 1 | $PbO$ | 24.0 | Yellow opaque glass. |
|   | $B_2O_3$ | 16.5 | |
|   | $Sb_2O_3$ | 2.0 | |
|   | $NaF$ | 7.0 | |
| 2 | $PbO$ | 24.0 | Do. |
|   | $B_2O_3$ | 16.5 | |
|   | $Sb_2O_3$ | 1.25 | |
|   | $NaF$ | 7.0 | |
| 3 | $PbO$ | 24.0 | Light yellow opaque glass. |
|   | $B_2O_3$ | 16.5 | |
|   | $Sb_2O_3$ | 0.75 | |
|   | $NaF$ | 7.0 | |
| 4 | $PbO$ | 40 | Colorless glass. |
|   | $B_2O_3$ | 34 | |
|   | $Sb_2O_3$ | 5 | |
|   | $NaF$ | 14 | |

The last frit was prepared utilizing 62.4 parts of boric acid as the $B_2O_3$ source.

Frits 1, 2 and 3 were ground in a ball mill and added to the polyvinyl acetate paint of Example I at the rate of 7 grams to 100 grams of the paint. Class F test results are as follows:

|  | Char area, sq. in. |
|---|---|
| Free antimony oxide | 9.3 |
| Frit 1 | 8.7 |
| Frit 2 | 9.0 |
| Frit 3 | 9.4 |

EXAMPLE VI

A preferred antimony oxide containing frit was added in various increments to the standard polyvinyl acetate coating and then applied to Fir-Tex fibre boards of 18 pound density; the results were as follows:

| Frit added as percent of resin solids | Class F Test, Char Area, sq. in. |
|---|---|
| 14 | 10.7 |
| 20 | 10.0 |
| 27 | 9.7 |
| 33 | 9.3 |
| 40 | 9.0 |

The frit contained 46% lead oxide, 32.7% boric oxide, 5.4% antimony trioxide and 15% sodium fluoride. Its water solubility at 20° was 100 milligrams in 100 cc. of water.

EXAMPLE VII

The frit of Example VI was added in the proportion of 7 grams to 100 grams of paint to three commercial exterior coatings:

1. National Lead—Dutch Boy,
2. Devoe and Raynolds, and
3. Du Pont.

These paints were applied at a level of 10 grams per square foot on Douglas fir plywood panels 6" x 12" x 5/8". They were allowed to dry 24 hours and a second coat was applied. After another 24 hours, a Class F test was made on Dutch Boy brand coating with the following results:

Control: Burned area of 14 square inches.
With frit: Burned an area of 11 square inches.

After 72 hours, the Devoe & Raynolds and Du Pont coatings were subjected to Class F fire tests with the following results:

Du Pont—Control: Burned an area of 16.5 sq. in. Flame burned 45 seconds after expiration of alcohol.
With frit: Char area of 10 sq. in. Flame went out immediately.
Devoe & Raynolds—Control: Burned an area of 13 sq. in.
With frit: Burned an area of 10 sq. in.

In both control and treated panels, the flame went out immediately after expiration of alcohol.

EXAMPLE VIII

Using Bakelite WC130 polyvinyl acetate resin, a coating was made up as follows:

| | Parts |
|---|---|
| $TiO_2$ | 25 |
| Lithopone | 50 |
| Clay | 25 |
| $H_2O$ | 30 |
| PVA | 85 |

Five grams of the frit of Example VI per 100 grams of paint was added, and the coating was applied to Douglas fir plywood panels 6" x 12" x 5/8" at a level of 20 grams per square foot of panel. Class F fire tests yielded the following results:

Control: Burned for one minute after expiration of alcohol. Width of burn was 3½" and length of burn was 6½".
With frit: Panel burned at base of board 30 seconds after expiration of alcohol. Width of burn was 2" and length of burn was 3½".

EXAMPLE IX

The frit of Example VI was substituted for antimony trioxide in two fire retardant coatings formulated by the Diamond Alkali Co. These coatings were alkyd based and employ Chlorowax and antimony trioxide as the fire retardants. Composition of these coatings is as follows:

*Formula No. 4—Interior flat*

| Component: | Lbs. per gallon |
|---|---|
| Titanium dioxide | 2.20 |
| Barium sulfate | 1.50 |
| Calcium carbonate | 2.85 |
| Magnesium silicate | 1.60 |
| Antimony trioxide | 1.00 |
| Alkyd resin—70% solids | 2.10 |
| Chlorowax | 0.70 |
| Lead naphthenate | 0.10 |
| Cobalt naphthenate | 0.01 |
| Manganese naphthenate | 0.01 |
| Mineral spirits | 2.27 |

*Formula No. 6—Interior semi-gloss*

| Component: | Lbs. per gallon |
|---|---|
| Titanium dioxide | 2.20 |
| Barium sulfate | 3.60 |
| Magnesium silicate | 1.15 |
| Antimony trioxide | 1.00 |
| Long oil alkyd—60% solids | 3.18 |
| Lead naphthenate | 0.09 |
| Cobalt naphthenate | 0.02 |
| Manganese naphthenate | 0.01 |
| Mineral spirits | 1.63 |

General Electric Glyptol Solution was used in Formula No. 4; Reichold Chemical P-822 Emulsifiable Beckoline Pure Long Oil Alkyd was used in Formula No. 6.

Three variations of the above formulae were prepared as follows:

(a) Formula as given.
(b) Formula as given with frit substituted for antimony trioxide.
(c) Formula with no antimony trioxide or frit.

Paints were applied to 6" x 12" x ¼" Douglas fir plywood panels at a level of 10 grams per panel, i. e., 2 coats of 5 grams each, allowing 24 hours between coats. TT—P—26A fire tests were made on these panels. This test is similar to Class F, the difference being that 5 cc. of alcohol are used instead of the 1 cc. as in Class F. Results of these tests were as follows:

| | Weight Loss, Grams | Char Area, Sq. Inches |
|---|---|---|
| Formula No. 4: | | |
| (a) with $Sb_2O_3$ | 11.0 | 30 |
| (b) with frit | 11.0 | 31 |
| (c) control | 11.8 | 35 |
| Formula No. 6: | | |
| (a) with $Sb_2O_3$ | 13.0 | 34 |
| (b) with frit | 12.5 | 30 |
| (c) control | 14.0 | 33 |

The differences between the paints in this series was not too great. All the boards delaminated at the glue line, thus tending to insulate the board below. Accordingly, 6" x 12" x ¼" panels were cut from a poplar, and the test was repeated with Formula No. 6. Three more variations of this formula were prepared, as follows:

(d) Formula as given with $Sb_2O_3$ and no Chlorowax.
(e) Formula as given with frit and no Chlorowax.
(f) Formula as given with no Chlorowax, frit or $Sb_2O_3$.

Results of TT—P—26A test were as follows:

| Coating | Total Weight Loss, grams | Volume of Char, cu. in. |
|---|---|---|
| a. Chlorowax and $Sb_2O_3$ | 13.2 | 5.1 |
| b. Chlorowax and frit | 12.0 | 5.0 |
| c. Chlorowax only | 14.0 | 5.6 |
| d. $Sb_2O_3$—no Chlorowax | 12.0 | 5.0 |
| e. Frit—no Chlorowax | 12.0 | 5.0 |
| f. No frit, Chlorowax or $Sb_2O_3$ | 14.0 | 5.3 |

EXAMPLE X

The following alkyd type coating was prepared using either antimony trioxide or the frit of Example VI containing $Sb_2O_3$:

| Component: | Lb./gal. |
|---|---|
| Titanium dioxide | 2.5 |
| $TiO_2$—calcium pigment | 2.35 |
| Zinc oxide | 1.70 |
| Magnesium silicate (talc) | 0.90 |
| Antimony trioxide or frit | 1.0 |
| Aluminum stearate | .85 |
| Alkyd resin (Beckolin P—822 Reichold) | 2.29 |
| Mineral spirits | 2.81 |
| Lead naphthenate | 0.078 |
| Cobalt naphthenate | 0.01 |

This coating was applied to treated 6" x 12" x ¼" poplar panels, as described in Bulletin TT—P26A, January 13, 1954. Paint was applied in two coats, 7 gm. per coat per panel, allowing 24 hours between coats. The paint was allowed to dry for five days and then placed in an oven set at 120° F. for 40 hours before making burn test. Results of burn tests were as follows:

| | Weight loss, gm. |
|---|---|
| With antimony trioxide | 21.5 |
| With frit | 20.0 |
| Control (no frit or antimony trioxide) | 26.5 |

With the coating containing the antimony trioxide, the flame on the board expired 30 seconds after expiration of alcohol. The coating containing the frit went out immediately. With the control panel, the board went on burning after expiration of alcohol and probably would have consumed the board had it not been extinguished.

EXAMPLE XI

Another alkyd type coating was prepared using either antimony trioxide alone or the frit of Example VI containing $Sb_2O_3$ and tested as in Example X.

| Component: | Lb./gal. |
|---|---|
| Titanium dioxide | 2.20 |
| Barium sulfate | 3.60 |
| Magnesium silicate | 1.15 |
| Antimony trioxide or frit | 1.00 |
| Alkyd resin 60% (Glyptol 2462 Gen. Elec.) | 3.18 |
| Chlorowax 70 | 1.26 |
| Lead naphthenate | 0.09 |
| Cobalt naphthenate | 0.01 |
| Mineral spirits | 1.63 |

Coatings were applied to treated poplar panels as in the preceding experiment. Fire test results were as follows:

| | Wt. loss, g. |
|---|---|
| With antimony trioxide | 17.9 |
| With frit | 18.0 |
| With frit but no Chlorowax | 17.0 |

The paint containing the antimony trioxide ruptured after two minutes of exposure to the flame. The ruptured film deflected the flame so that the board began burning along the edges and burned for five minutes after expiration of the alcohol and had to be extinguished. A second board painted with the same coating behaved in like fashion.

The flame on the board painted with the coating containing the frit went out 30 seconds after expiration of the alcohol.

With the coating containing frit but no Chlorowax the flame went out in 20 seconds after expiration of the alcohol.

EXAMPLE XII

An alkyd based paint was prepared using the same formula as in Example XI, except that Rezyl 775—4 70% American Cyanamid instead of Glystol was used, with the following results:

| | Wt. loss, gm. |
|---|---|
| With antimony trioxide | 15.0 |
| With frit | 15.5 |

With antimony trioxide, the flame went out in 30 seconds after expiration of alcohol; with the frit of Example VI, in 45 seconds.

EXAMPLE XIII

The test of Example XII was repeated with a linseed oil base exterior type coating:

| Component: | Lb./gal. |
|---|---|
| Titanium dioxide | 1.0 |
| 35% leaded zinc oxide | 4.29 |
| Magnesium silicate | 1.36 |
| Calcium carbonate | 1.82 |
| Antimony trioxide or frit | 1.00 |
| Chlorowax 70 | 1.82 |
| Raw linseed oil | 1.05 |
| Japan drier | 0.23 |
| Mineral spirits | 1.00 |

Paints were applied to treated poplar panels, allowing 48 hours between coats. The results of burn tests were as follows:

| | Wt. loss, gm. |
|---|---|
| With antimony trioxide | 20.5 |
| With frit of Example VI | 19.5 |
| Control (no Chlorowax, frit or $Sb_2O_3$) | 24.0 |

On the control board, the flame burned for five minutes after expiration of alcohol and had to be extinguished. With both the antimony trioxide and frit containing paints, the flame on the board went out in 15 seconds after expiration of alcohol. Flame spread was ¼" less on the frit treated coating than on the antimony trioxide treated coating.

EXAMPLE XIV

The frit of Example VI containing $Sb_2O_3$ was added in increments to the standard polyvinyl acetate paint and applied to Fir-Tex fibre boards of 18 pounds density and then tested, with the following results:

| Frit added—as percent of resin solids | Class F Test, Char Area, sq. in. |
|---|---|
| 14 | 10.7 |
| 20 | 10.0 |
| 27 | 9.7 |
| 33 | 9.3 |
| 40 | 9.0 |

We claim:

1. A protective coating compositon, having good surface adherence characteristics and being resistant to elevated temperatures, comprising in substantially homogeneous admixture, an organic film-forming material, an inorganic coloring material in finely divided form, and from 5% to 15% on the weight of the composition on a wet basis of an inorganic frit consisting of the finely divided production of the fusion at about 370° C. of from about 20 to 50 parts of boric oxide, from about 25 to 60 parts of lead oxide, and from about 1 to about 20 parts of sodium fluoride.

2. A protective coating composition, having good surface adherence characteristics and being resistant to elevated temperatures, comprising in substantially homogeneous admixture, an organic film-forming material, an inorganic coloring material in finely divided form, and from 5% to 15% on the weight of the composition on a wet basis of an inorganic frit consisting of the finely divided product of the fusion at about 370° C. of from about 30 to 37 parts of boric oxide, from about 48 to 60 parts of lead oxide, and from about 10 to about 15 parts of sodium fluoride.

3. A protective coating composition, having good surface adherence characteristics and being resistant to elevated temperatures, comprising in substantially homogeneous admixture, an organic film-forming material, an inorganic coloring material in finely divided form, and from 5% to 15% on the weight of the composition on a wet basis of an inorganic frit consisting of the finely divided product of the fusion at about 370° C. of from about 20 to 50 parts of boric oxide, from about 25 to 60 parts of lead oxide, about 5 parts of antimony oxide, and from about 1 to about 20 parts of sodium fluoride.

4. A protective coating composition, having good surface adherence characteristics and being resistant to elevated temperatures, comprising in substantially homogeneous admixture, an organic film-forming material, an inorganic coloring material in finely divided form, and from 5% to 15% on the weight of the composition on a wet basis of an inorganic frit consisting of the finely divided product of the fusion at about 370° C. of from about 30 to 37 parts of boric oxide, from about 48 to 60 parts of lead oxide, about 5 parts of antimony oxide, and from about 10 to about 15 parts of sodium fluoride.

References Cited in the file of this patent

UNITED STATES PATENTS

| 2,283,090 | Power | May 12, 1942 |
|---|---|---|
| 2,356,317 | Harbert et al. | Aug. 22, 1944 |
| 2,378,715 | Leatherman | June 19, 1945 |
| 2,400,337 | Buechner | May 14, 1946 |
| 2,402,864 | Zurcher | June 25, 1946 |
| 2,420,644 | Athey et al. | May 20, 1947 |
| 2,467,114 | Deyrup | Apr. 12, 1949 |